United States Patent
Usami

(10) Patent No.: US 11,838,477 B2
(45) Date of Patent: Dec. 5, 2023

(54) IMAGE FORMING APPARATUS AND CONTROL METHOD OF IMAGE FORMING APPARATUS

(71) Applicant: CANON KABUSHIKI KAISHA, Tokyo (JP)

(72) Inventor: Kenta Usami, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/947,293

(22) Filed: Sep. 19, 2022

(65) Prior Publication Data

US 2023/0097776 A1    Mar. 30, 2023

(30) Foreign Application Priority Data

Sep. 28, 2021   (JP) ................. 2021-157671

(51) Int. Cl.
*H04N 1/00*       (2006.01)
*H04N 1/32*       (2006.01)
*G06F 3/12*       (2006.01)
*G06K 15/02*      (2006.01)

(52) U.S. Cl.
CPC ..... *H04N 1/32598* (2013.01); *H04N 1/00896* (2013.01)

(58) Field of Classification Search
CPC .................. H04N 1/32598; H04N 1/00896
See application file for complete search history.

(56) References Cited

U.S. PATENT DOCUMENTS

| 4,809,216 A | * | 2/1989 | Lai .......... G06K 15/00 |
| | | | 358/1.17 |
| 5,274,761 A | * | 12/1993 | Davidson ........ G06T 1/60 |
| | | | 358/448 |

FOREIGN PATENT DOCUMENTS

| JP | H04195552 | * | 7/1992 | ........ G06F 11/28 |
| JP | H10320267 | * | 12/1998 | ........ G06F 12/00 |
| JP | 2001080108 | * | 3/2001 | ........ B41J 3/00 |
| JP | 2004038703 | * | 2/2004 | ........ G06F 11/30 |
| JP | 2009163531 | * | 7/2009 | ........ G06F 13/24 |
| JP | 2019212027 A | | 12/2019 | |

* cited by examiner

*Primary Examiner* — Beniyam Menberu
(74) *Attorney, Agent, or Firm* — ROSSI, KIMMS & McDOWELL LLP

(57) ABSTRACT

A communication I/F of an image generating unit writes settings for an image data to a transitory storage unit by serial communication before the image data is transmitted from the image generating unit to the transitory storage unit. The communication I/F stores partial information of an address used for previous writing in a cache unit, and omits the writing of the partial information of the address used for further writing if the partial information of the address matches the partial information of the stored address.

8 Claims, 11 Drawing Sheets

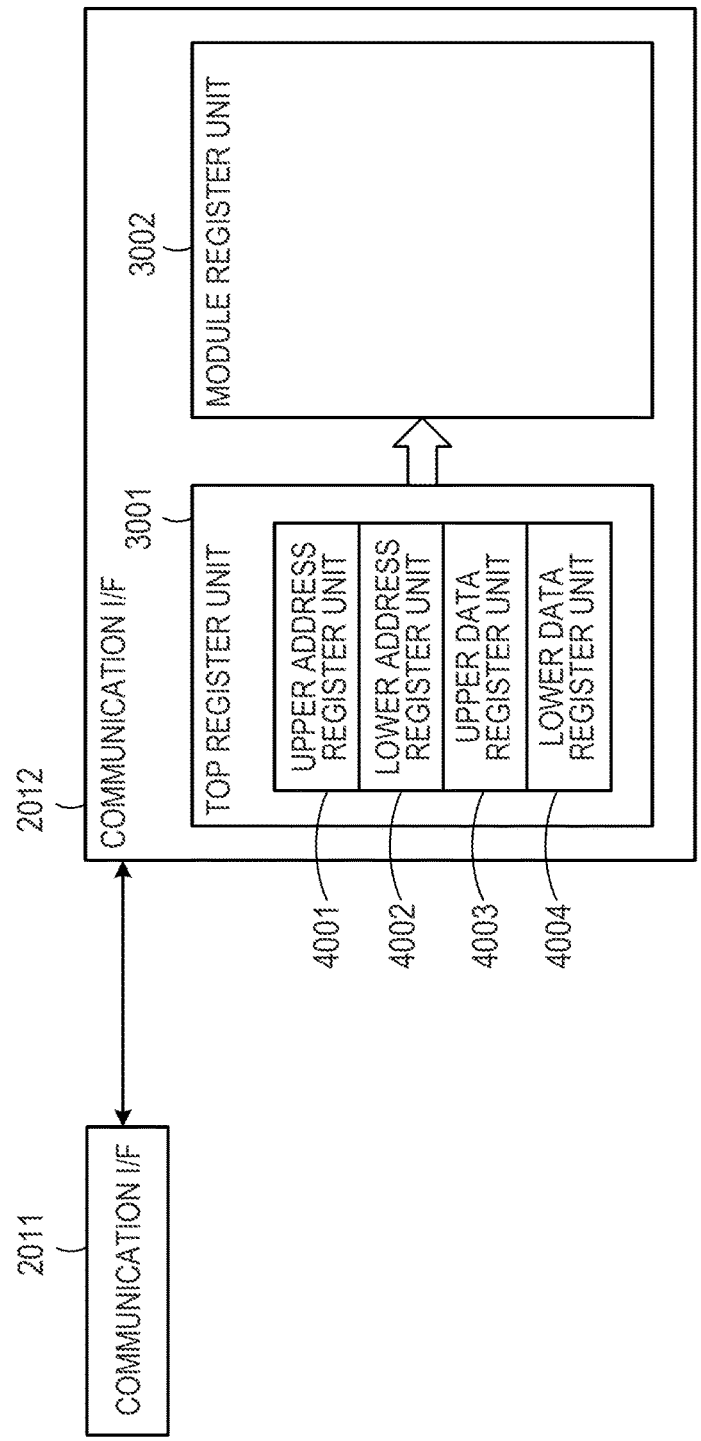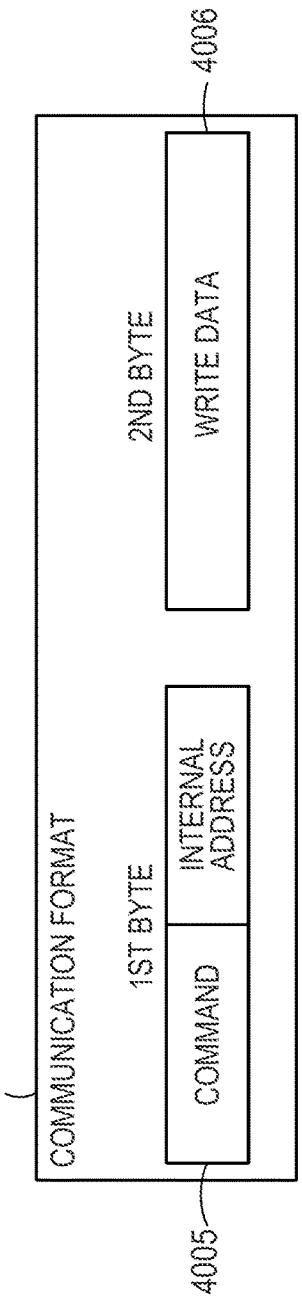

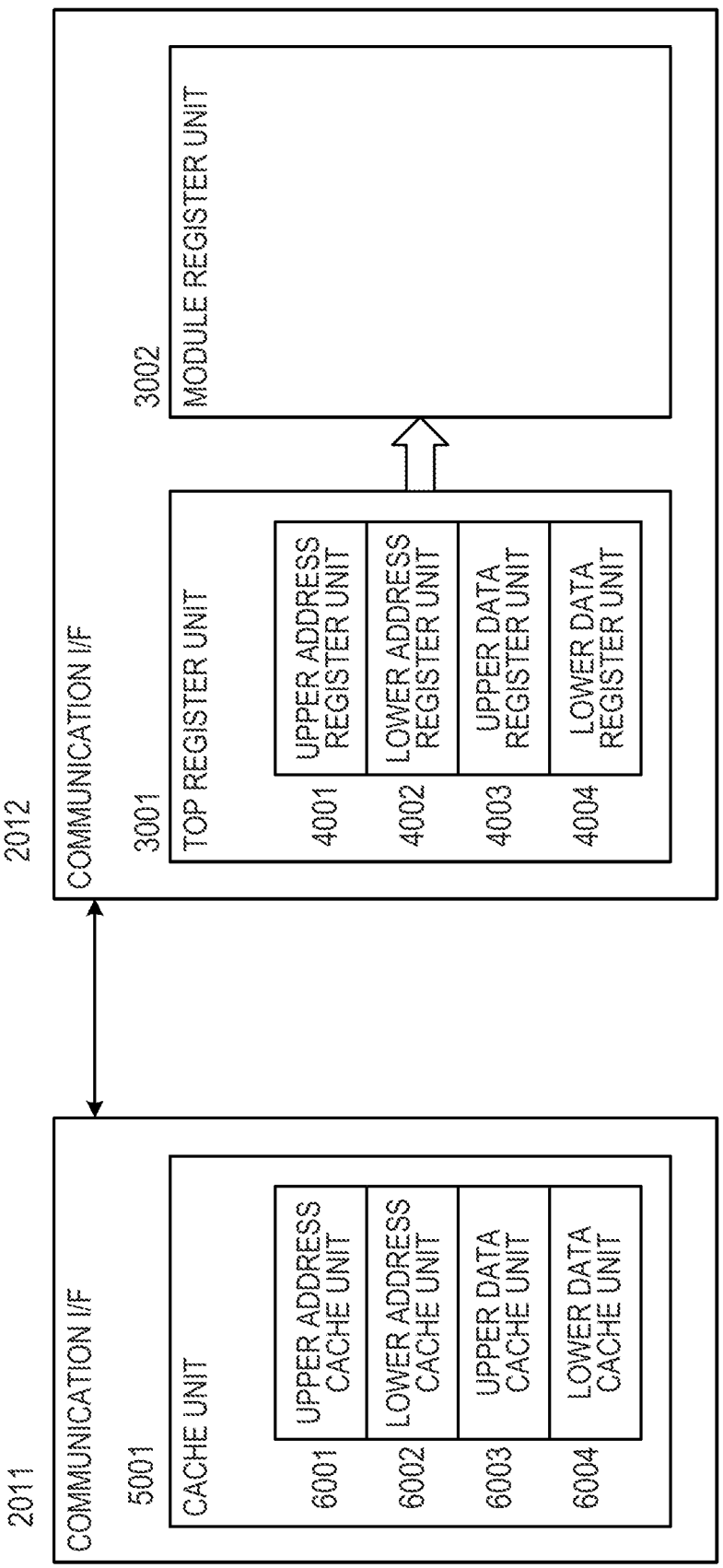

FIG. 6C

| | UPPER ADDRESS | LOWER ADDRESS | UPPER DATA | LOWER DATA |
|---|---|---|---|---|
| SPECIFY THE NUMBER OF PIXELS IN MAIN SCANNING DIRECTION (ALL CH) | 0x00 | 0x00 | ARBITRARY VALUE | ARBITRARY VALUE |
| SPECIFY THE NUMBER OF LINES TO INPUT (ALL CH) | 0x00 | 0x01 | ARBITRARY VALUE | ARBITRARY VALUE |
| ~ | ~ | ~ | ~ | ~ |
| SPECIFY THE NUMBER OF PIXELS IN MAIN SCANNING DIRECTION (CH 0) | 0x10 | 0x00 | ARBITRARY VALUE | ARBITRARY VALUE |
| SPECIFY THE NUMBER OF LINES TO INPUT (CH 0) | 0x10 | 0x01 | ARBITRARY VALUE | ARBITRARY VALUE |
| ~ (CH1 AND CH2 ARE OMITTED.) ~ | ~ | ~ | ~ | ~ |
| SPECIFY THE NUMBER OF PIXELS IN MAIN SCANNING DIRECTION (CH 3) | 0x40 | 0x00 | ARBITRARY VALUE | ARBITRARY VALUE |
| SPECIFY THE NUMBER OF LINES TO INPUT (CH 3) | 0x40 | 0x01 | ARBITRARY VALUE | ARBITRARY VALUE |
| ~ | ~ | ~ | ~ | ~ |

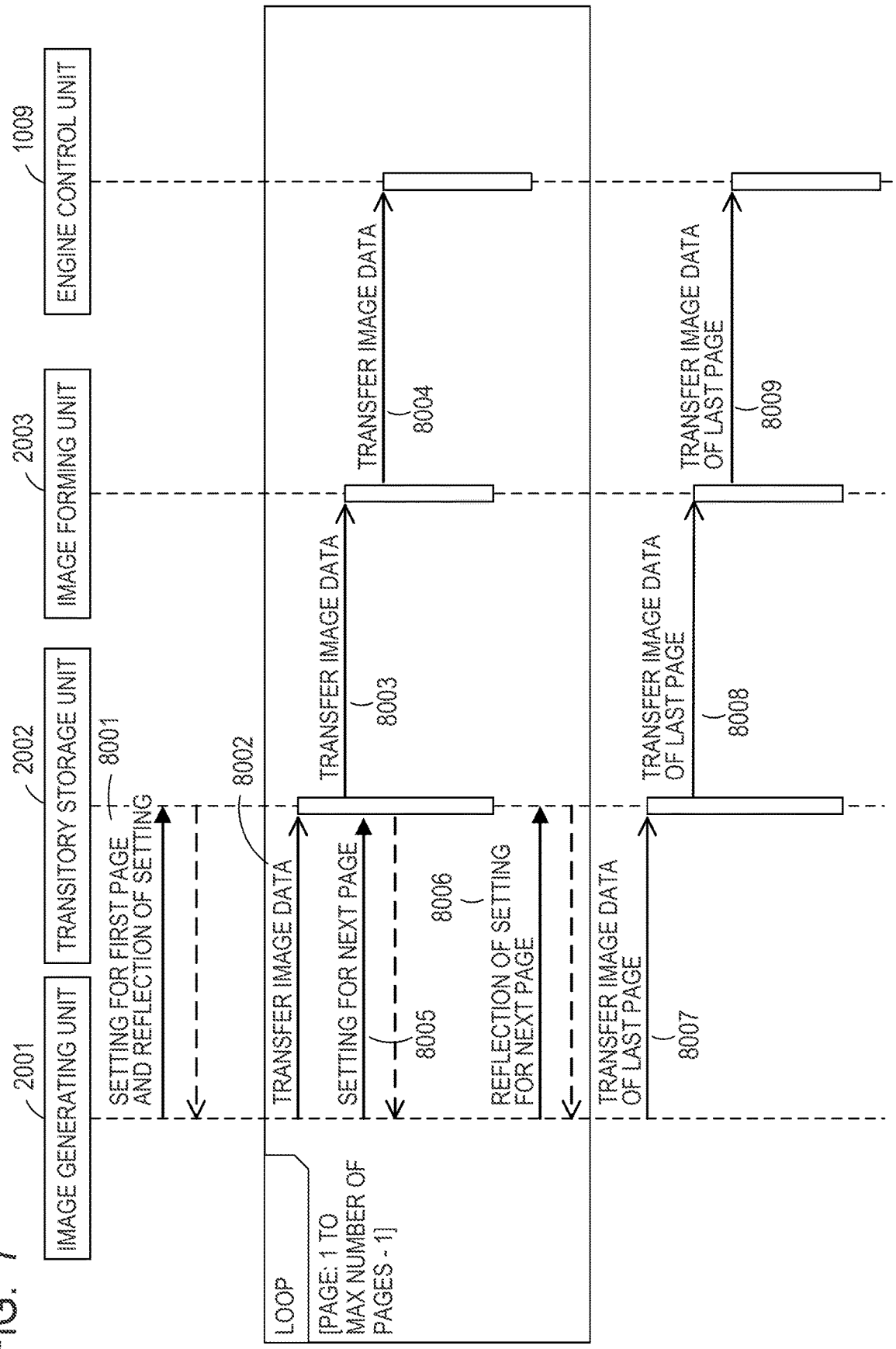

IMAGE FORMING APPARATUS AND CONTROL METHOD OF IMAGE FORMING APPARATUS

BACKGROUND OF THE INVENTION

Field of the Invention

The present invention relates to an image forming apparatus and a control method of the image forming apparatus.

Description of the Related Art

A digital multifunction peripheral (MFP) having functions such as a scanner, a printer, and a copy has been used. The operation of the digital MFP is generally controlled by a controller for performing image processing and image input/output control. An ASIC (Application Specific Integrated Circuit) may be used as a controller.

In recent years, there has been a demand for a high-speed printing operation in a digital MFP. The print operation requires real-time processing which does not stop after the start of the operation at least until the input/output of the image data of the page under processing is completed. Here, the controller may temporarily reduce the processing speed. In order to perform the printing operation by the real-time processing, it is necessary to normally continue the transfer of image data between the controller and the printer or the like even if the processing speed of the controller is temporarily reduced. Therefore, the digital multifunction device is provided with a short buffer for temporarily storing image data. This short buffer is mounted inside the ASIC.

A related technique is disclosed in Japanese Patent Application Laid-Open No. 2019-212027. Japanese Patent Application Laid-Open No. 2019-212027 discloses an image processing apparatus having a short buffer.

In addition, in order to shorten the time interval of data transfer between the controller and the printer engine, a storage circuit with transitory storage for buffer is provided between the controller and the printer engine. This storage circuit includes, for example, a Field Programmable Gate Array (FPGA). To use the storage circuit, the controller must access the storage circuit's registers to make various settings.

When a plurality of sheets of image data are printed, setting the storage circuit for the image data of the next page must be completed while the current image data is transferred, or processing speed will be reduced. If a serial communication interface (I/F) is used for register access of the storage circuit by the controller, the above situation may arise depending on the communication method. Therefore, efficient serial communication is required in register access of the storage circuit from the controller.

The present invention has been made to solve the above problem. The purpose of the present invention is providing a mechanism for efficiently writing settings by serial communication to a circuit having a transitory memory for buffering, which is provided between an image generating unit and an image forming unit, thereby preventing a reduction of processing speed and enabling a high-speed printing operation.

SUMMARY OF THE INVENTION

According to an aspect of the present invention, an image forming apparatus comprises an image generating unit generating image data, an image forming unit controlling for forming the image data, a storing circuit arranged between the image generating unit and the image forming unit, wherein the storing circuit transitory stores the image data, and a serial interface storing a setting of the image data in the storing circuit, wherein the serial interface stores partial information of an address used for previous writing, and omits storing partial information of the address used for further writing if the partial information of an address used for further writing matches the partial information of the address used for the previous writing.

Further features of the present invention will become apparent from the following description of exemplary embodiments with reference to the attached drawings.

BRIEF DESCRIPTION OF THE DRAWINGS

FIG. 5A illustrates a diagram of the communications between communication I/Fs according to the present embodiment.

FIG. 5B illustrates a diagram of the communication format between communication I/Fs according to the present embodiment.

FIG. 6A is a block diagram illustrating the communication control method between communication I/Fs of this embodiment.

FIG. 6C illustrates an example of setting communication volume reduction in the communication control method between communication I/Fs of the present embodiment.

FIG. 7 illustrates a diagram explaining the sequence from job submission to completion of printing in the image forming apparatus according to the present embodiment.

DESCRIPTION OF THE EMBODIMENTS

Next, a configuration for carrying out the present invention will be described with reference to the drawings.

<Description of System Configuration>

A preferred embodiment of the present invention will be described in detail below with reference to the attached drawings. Note that the following embodiment does not limit the invention to which the claims pertain, and not all of the combinations of features described in the present embodiment are essential to the means of solving the invention.

Figure 1:
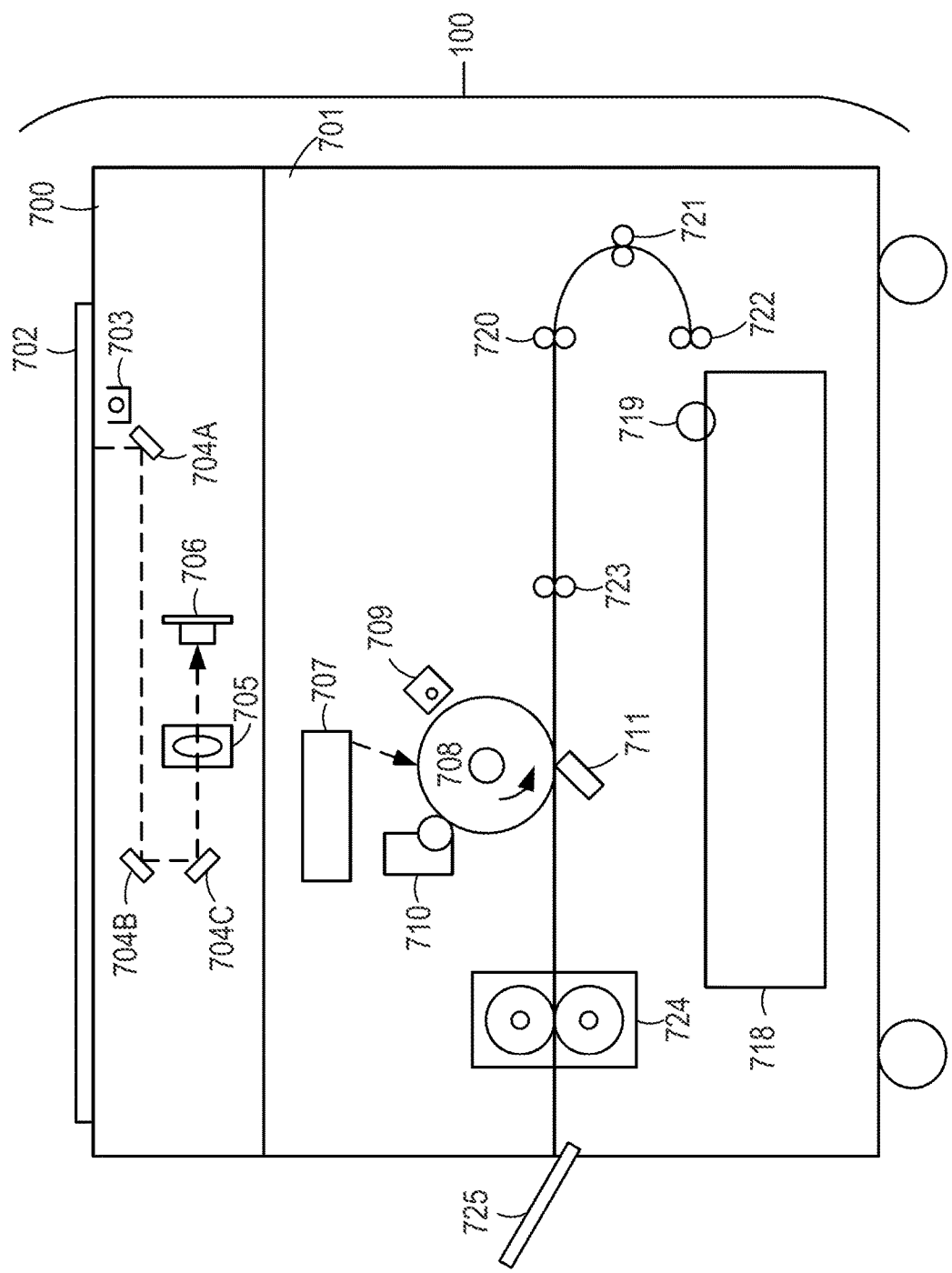
FIG. 1 illustrates a cross-sectional view of an image forming apparatus according to the present embodiment.

An image forming apparatus as an embodiment of an information processing apparatus according to the present invention will be described. FIG. 1 illustrates a cross-sectional view of the configuration of an electrophotographic duplicator (hereinafter referred to as an "image forming apparatus") 100 showing one embodiment of the present invention. The image forming apparatus is not limited to a copying apparatus, but may be, for example, a facsimile apparatus, a printing apparatus, etc. The format of the image forming apparatus may be either monochrome or color. Furthermore, the printing method of the image forming apparatus is not limited to the electrophotographic method.

The configuration and functions of the image forming apparatus 100 are described below with reference to FIG. 1. As shown in FIG. 1, the image forming apparatus 100 has an image reading apparatus (hereinafter referred to as "reader") 700 and an image printing apparatus 701.

First, the reading configuration and functions of the reader 700 will be described. In the reader 700, an illumination lamp 703 illuminates a document on a platen glass 702, and reflected light from the document is guided to a color sensor 706 via an optical system including reflecting mirrors 704 A, 704 B, and 704 C, and a lens 705. The reader 700 reads the light incident on the color sensor 706 as described above for each color of blue (hereinafter referred to as "B"), green (hereinafter referred to as "G"), and red (hereinafter referred to as "R") and converts them into electrical image signals. Furthermore, the reader 700 obtains image data by performing color conversion processing based on the intensities of the B, G, and R image signals, and outputs the image data to an image control unit 1007 (see FIG. 2), which will be described later.

Next, the printing configuration and functions of the image printing apparatus 701 will be described. Inside the image printing apparatus 701, a sheet storage tray 718 is provided. The recording medium stored in the sheet storage tray 718 is fed by a sheet feed roller 719 and fed to a stopped registration roller (hereinafter referred to as a "registration roller") 723 by conveyance rollers 722, 721 and 720. The tip of the recording medium conveyed in the direction of conveyance by the conveyance roller 720 abuts on a nip part of the registration roller 723 in the stopped state. Then, if the conveyance roller 720 further conveys the recording medium with the tip of the recording medium abutting on the nip part of the registration roller 723 in the stopped state, the recording medium warps. As a result, an elastic force is applied to the recording medium, and the tip of the recording medium abuts along the nip of the registration roller 723. Thus, the skew correction of the recording medium is performed. After the skew correction of the recording medium, the registration roller 723 starts carrying the recording medium at the timing described later. The recording medium is one on which images are formed by an image forming apparatus. For example, the recording medium may include papers, resin sheets, cloth, transparencies, labels, and the like.

On the other hand, the image data obtained by the reader 700 is corrected by the image control unit 1007, is output according to the timing described later, and is input to a laser scanner unit 707 including a laser and a polygon mirror. The outer surface of a photoreceptor drum 708 is charged by a charger 709. After the outer surface of the photoreceptor drum 708 is charged, laser light corresponding to the image data input to the laser scanner unit 707 is irradiated from the laser scanner unit 707 onto the outer surface of the photoreceptor drum 708. As a result, an electrostatic latent image is formed on the photosensitive layer (photoreceptor) covering the outer surface of the photoreceptor drum 708. The operation of the laser scanner unit 707 will be described later with reference to FIG. 2.

Subsequently, the electrostatic latent image is developed by the toner in a developing machine 710, and a toner image is formed on the outer surface of the photoreceptor drum 708. The toner image formed on the photoreceptor drum 708 is transferred to the recording medium by a transfer charger 711 provided at a position (transfer position) opposite to the photoreceptor drum 708. The registration roller 723 feeds the recording medium to the transfer position at the timing when the toner image is transferred to the prescribed position of the recording medium.

As described above, the recording medium on which the toner image has been transferred is fed to a fixer 724, heated and pressurized by the fixer 724, and the toner image is fixed on the recording medium. The recording medium on which the toner image is fixed is discharged to a sheet discharge tray 725 outside the apparatus. In this way, an image is formed on the recording medium by the image forming apparatus 100. The above describes the configuration and functions of the image forming apparatus 100.

Figure 2:
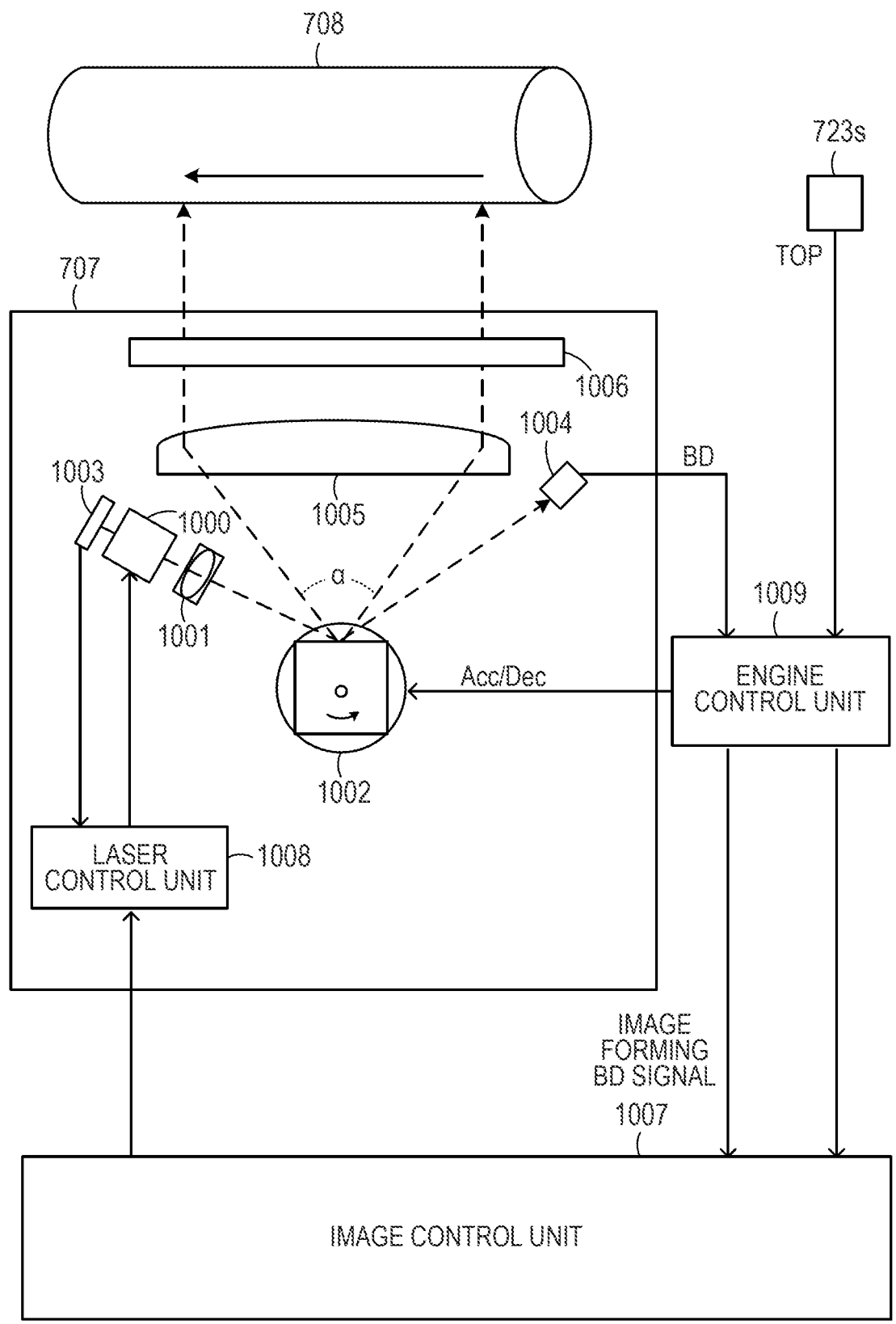
FIG. 2 illustrates a schematic diagram of a laser scanner unit according to the present embodiment.

FIG. 2 illustrates an example of the configuration of the laser scanner unit 707. The configuration of the laser scanner unit 707 is described below. As shown in FIG. 2, laser light is emitted from both ends of a laser light source 1000. The laser light emitted from one end of the laser light source 1000 is incident on a photodiode 1003. The photodiode (PD) 1003 converts the incident laser light into an electrical signal and outputs the electrical signal as a PD signal to a laser control unit 1008. Based on the input PD signal, the laser control unit 1008 controls (Auto Power Control, hereinafter referred to as "APC") the output light quantity of the laser light source 1000 so that the output light quantity of the laser light source 1000 becomes a predetermined light quantity.

On the other hand, laser light emitted from the other end of the laser light source 1000 is irradiated onto a polygon mirror 1002, which is a rotating polyhedral mirror via a collimator lens 1001.

The polygon mirror 1002 is rotationally driven by a polygon motor (not shown). The polygon motor is controlled by a drive signal (Acc/Dec) output from an engine control unit 1009. Laser light irradiated on the rotating polygon mirror 1002 is deflected by the polygon mirror 1002. Scanning of the outer surface of the photoreceptor drum 708 by the laser light modified by the polygon mirror 1002 is performed from right to left as shown in FIG. 2.

The laser light scanning the outer surface of the photoreceptor drum 708 is corrected by an F-θ lens 1005 so as to scan the outer surface of the photoreceptor drum 708 at a constant speed, and is irradiated onto the outer surface of the photoreceptor drum 708 via a folding mirror 1006.

The laser light deflected by the polygon mirror 1002 is incident on a BD (Beam Detect) sensor 1004, which is a light receiving unit including a light receiving element for receiving the laser light. In the present embodiment, the BD sensor 1004 is arranged at a position where the laser light is irradiated on the outer surface of the photoreceptor drum 708 after the BD sensor 1004 detects the laser light in the period from the detection of the laser light by the BD sensor 1004 to the detection of the laser light again. Specifically, for example, as shown in FIG. 2, the BD sensor 1004 is arranged in a region outside a region represented by an angle α among the regions through which the laser light reflected by the polygon mirror 1002 passes and in a region upstream in the direction in which the laser light is operated.

The BD sensor 1004 generates a BD signal based on the detected laser light and outputs the BD signal to the engine control unit 1009. Based on the input BD signal, the engine control unit 1009 controls the polygon motor so that the rotation period of the polygon mirror 1002 becomes a predetermined period. When the period of the BD signal becomes a period corresponding to the predetermined period, the engine control unit 1009 determines that the rotation period of the polygon mirror 1002 has become the predetermined period.

The engine control unit 1009 outputs an image forming BD signal to the image control unit 1007 in response to the input BD signal. The image forming BD signal is synchronized with the BD signal. The image forming BD signal corresponds to a signal indicating a scanning period in which the laser light scans the photoreceptor drum 708.

The image control unit 1007 outputs the corrected image data to the laser control unit 1008 in response to the input image forming BD signal and a timing signal for starting image formation (hereinafter referred to as the "TOP signal") input from a registration sensor 723s provided downstream of the registration roller 723. Since the operation of the image control unit 1007 is one of the features of the present invention, detailed explanations will be given later.

The laser control unit 1008 generates laser light used for forming an image on the outer surface of the photoreceptor drum 708 by lighting the laser light source 1000 based on the input image data. In this way, the laser control unit 1008 is controlled by the image control unit 1007, which is an information processing apparatus. The generated laser light is irradiated on the outer surface of the photoreceptor drum 708 in the manner described above. The above describes the configuration of the laser scanner unit 707.

Figure 3:
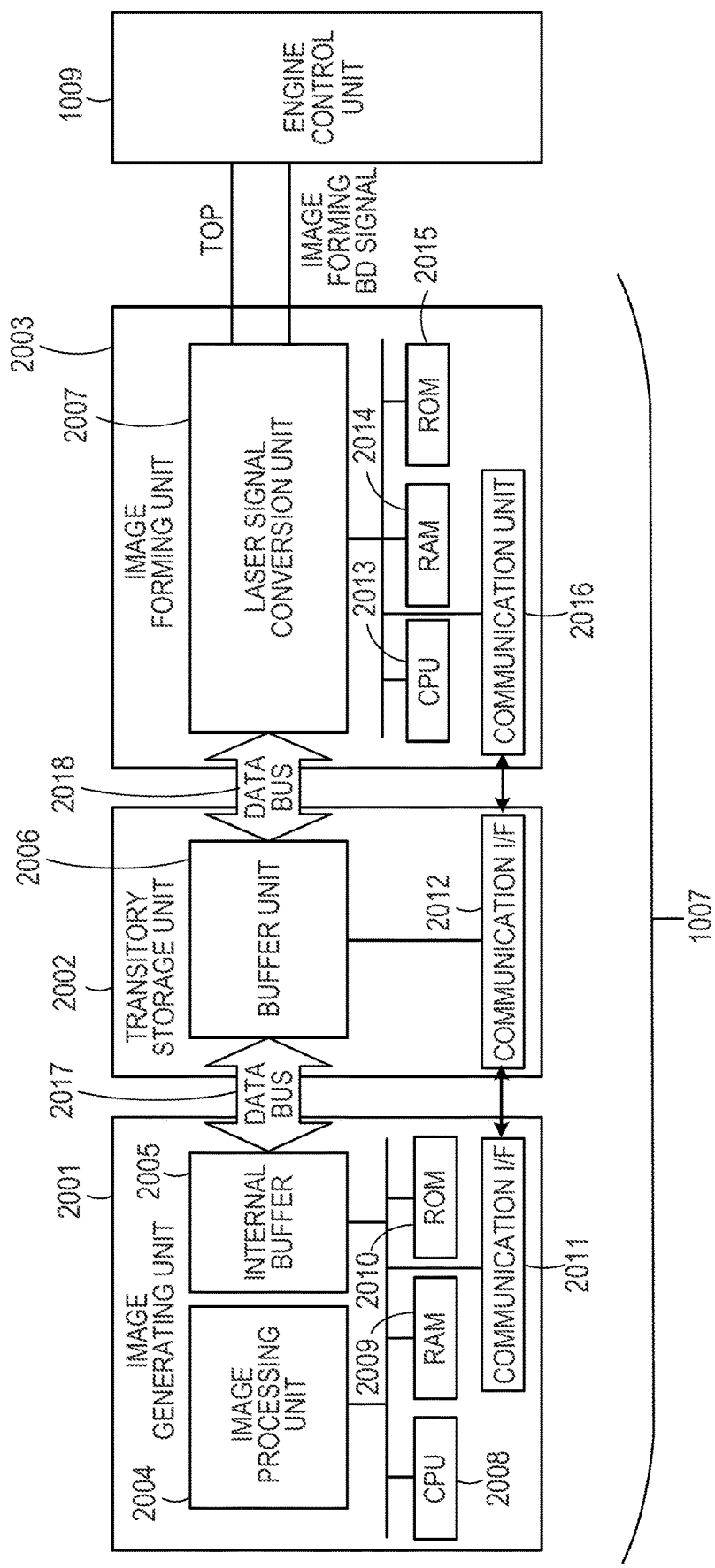
FIG. 3 illustrates a detailed block diagram of the image control unit according to the present embodiment.

FIG. 3 illustrates a block diagram showing an example of the configuration of the image control unit 1007. The image control unit 1007 has an image generating unit 2001, a transitory storage unit 2002, and an image forming unit 2003.

First, the image generating unit 2001 will be described. The image generating unit 2001 has an image processing unit 2004, an internal buffer 2005, a CPU 2008, a RAM 2009, a ROM 2010, and a communication I/F 2011. The image processing unit 2004 performs color conversion processing on the image data input from the reader 700. If the image data is monochrome image data, black color conversion processing is performed on the image data, and if the image data is color image data, yellow, cyan, magenta, and black color conversion processing is performed on the image data.

The internal buffer 2005 is a short buffer for temporarily storing the image data processed by the image generating unit 2001, and transmits the image data to the transitory storage unit 2002 along a data bus described later.

The CPU 2008 integrally controls each process executed in the image generating unit 2001 and the transitory storage unit 2002 based on a control program and the like stored in the ROM 2010. RAM 2009 is a memory such as DRAM where data is temporarily stored and works as a work memory. The ROM 2010 is a nonvolatile memory and stores boot programs, control programs and the like of the image generating unit 2001 and the transitory storage unit 2002. The communication I/F 2011, which is a serial communication I/F (serial interface) or the like, transmits and receives register settings and status to the transitory storage unit 2002 and notifies the image forming unit 2003 of the completion of image preparation.

Next, the transitory storage unit 2002 will be described. The transitory storage unit 2002 is a storage circuit having a buffer unit 2006 and a communication I/F 2012. The transitory storage unit 2002 can be configured with, for example, an FPGA (Field Programmable Gate Array).

The buffer unit 2006 functions as a transitory storage for buffer between the image generating unit 2001 and the image forming unit 2003. The buffer unit 2006 temporarily stores image data input from the image generating unit 2001 and outputs data in response to a request signal transmitted from the image forming unit 2003. At this time, frequency switching is performed at the operating frequency of the data bus between the image generating unit 2001 and the buffer unit 2006 (hereafter referred to as "$f_{in}$") and at the operating frequency of the data bus between the buffer unit 2006 and the image forming unit 2003 (hereafter referred to as "$f_{out}$"). The buffer unit 2006 shortens a time interval of the data transfer between the image generating unit 2001 and the image forming unit 2003, and by synchronizing the image data transfer to the image forming unit 2003, the required performance can be satisfied.

The communication I/F 2012 is a serial communication I/F (serial interface) or the like, and transmits and receives register settings and status transmitted from the image generating unit 2001. To use the transitory storage unit 2002, it is necessary to access the registers of the transitory storage unit 2002 to make various settings by the image generating unit 2001.

Next, the image forming unit 2003 will be described. The image forming unit 2003 has a laser signal conversion unit 2007, a CPU 2013, a RAM 2014, a ROM 2015, and a communication I/F 2016. The laser signal conversion unit 2007 generates an image request signal from the TOP signal input from a registration sensor 723s and an image forming BD signal input from the engine control unit 1009, and inputs the generated image request signal to the transitory storage unit 2002. Then, the laser signal conversion unit 2007 converts the image data input from the transitory storage unit 2002 into a laser signal to output the laser signal to the laser control unit 1008.

The CPU 2013 integrally controls each process executed by the image forming unit 2003 based on a control program and the like stored in the ROM 2015. RAM 2014 is a memory such as DRAM, where data is temporarily stored and serves as a work memory. The ROM 2015 is a nonvolatile memory and stores a boot program, a control program, and the like of the image forming unit 2003. The communication I/F 2016 is a serial communication I/F or the like, and receives the notification about the completion of image preparation from the transitory storage unit 2002.

The data bus 2017 connects the image generating unit 2001 and the transitory storage unit 2002, and the data bus 2018 connects the transitory storage unit 2002 and the image forming unit 2003. The data buses 2017, 2018 are described with reference to FIG. 4.

Figure 4:
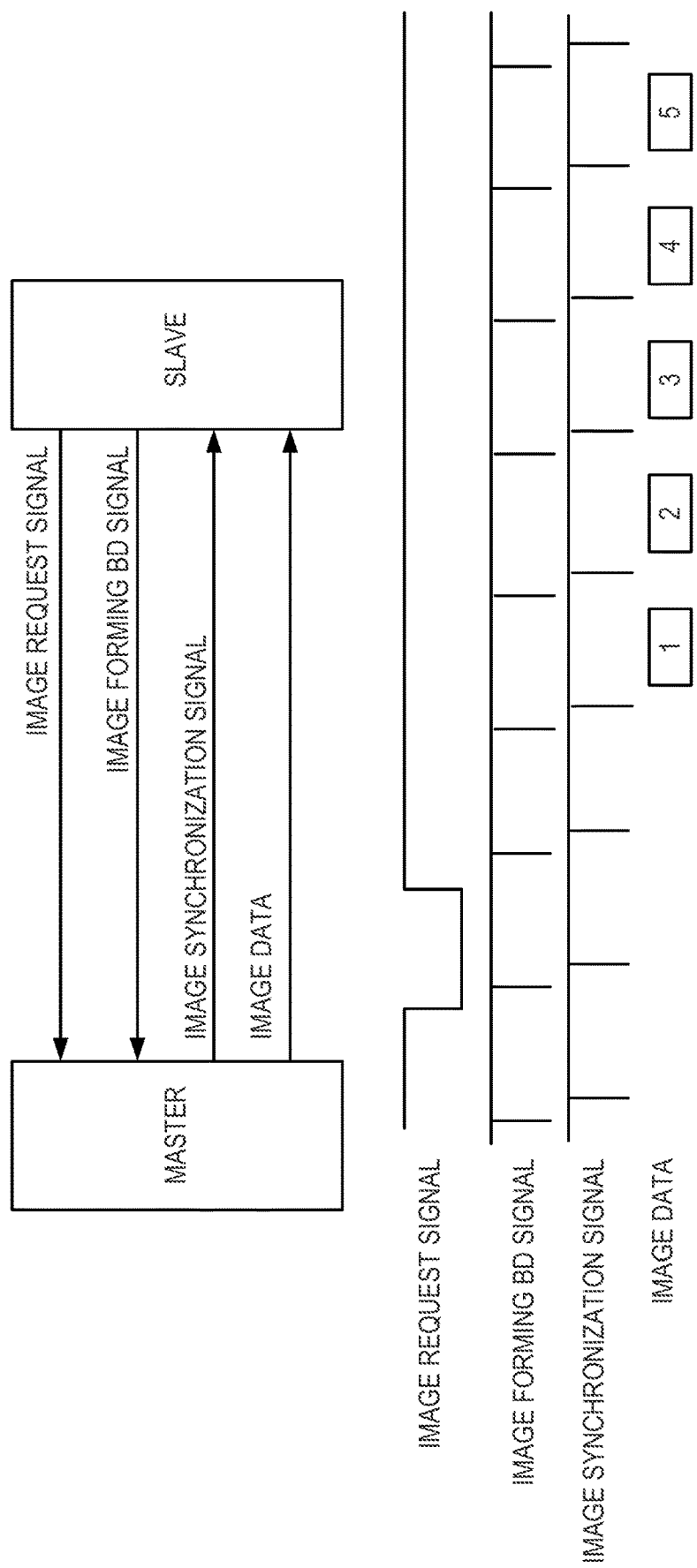
FIG. 4 illustrates a timing chart of the data bus between the image control unit and the transitory storage unit and between the transitory storage unit and the image forming unit according to the present embodiment.

FIG. 4 illustrates an example of the schematic configuration of the data buses 2017 and 2018. The signals constituting the data buses 2017 and 2018 will be explained below. Here, the data receiver is referred to as the "slave side" and the data transmitter is referred to as the "master side".

The image request signal is a signal transmitted from the slave side to the master side and indicates the start of image transfer. If image request signal is asserted, the master side begins image transfer. The image forming BD signal is a signal transmitted from the slave side to the master side and is a "main scanning synchronization signal" indicating the head of one line of image data. If the master side receives the image forming BD signal, the master side transmits an image synchronization signal to the slave side in synchronization with the image forming BD signal. Each line of image data is transmitted from the master side to the slave side in synchronization with the time of asserting the image synchronization signal.

Figure 5C:
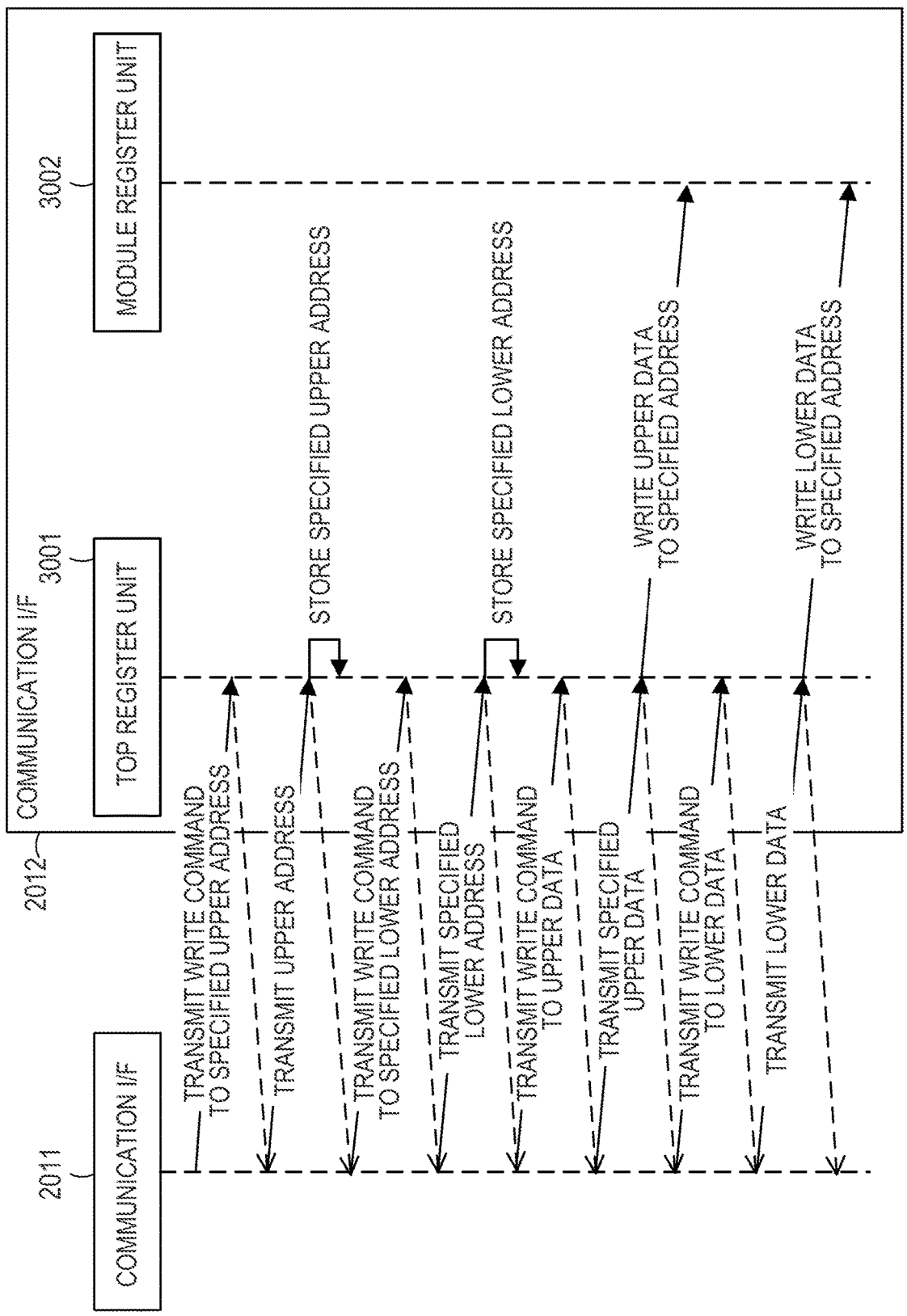
FIG. 5C illustrates a diagram of the communications between communication I/Fs according to the present embodiment.
Figure 5D:
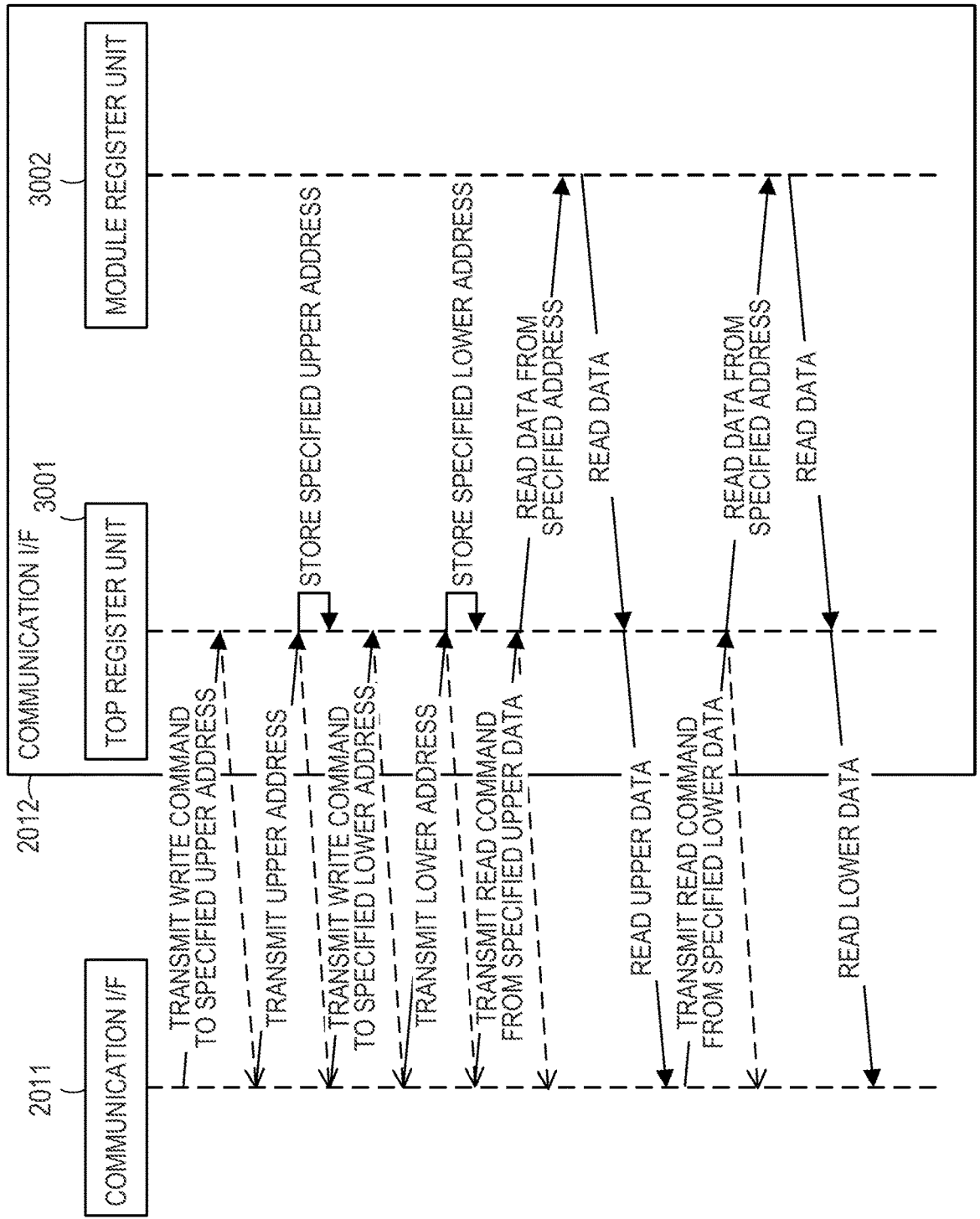
FIG. 5D illustrates a diagram of the communications between communication I/Fs according to the present embodiment.

FIGS. 5A, 5B, 5C, and 5D illustrate communications between the communication I/F 2011 and the communication I/F 2012. Hereafter, FIGS. 5A, 5B, 5C, and 5D are collectively referred to as "FIG. 5". FIG. 5A illustrates a detailed block diagram of the communication I/F 2011 and the communication I/F 2012. FIG. 5B illustrates a communication format when accessing the communication I/F 2012 from the communication I/F 2011. FIG. 5C illustrates a sequence of write access from the communication I/F 2011 to the communication I/F 2012. FIG. 5D illustrates a sequence of read access from the communication I/F 2011 to the communication I/F 2012.

As shown in FIG. 5A, the communication I/F 2012 includes a top register unit 3001 and a module register unit 3002. The top register unit 3001 includes an upper address register unit 4001, a lower address register unit 4002, an upper data register unit 4003, and a lower data register unit 4004.

The communication I/F 2011 accesses the module register unit 3002 via each register 4001 to 4004 of the top register unit 3001 of the communication I/F 2012. Details will be described later using the sequence of write access shown in FIG. 5C and the sequence of read access shown in FIG. 5D.

The module register unit 3002 is a register equipped with each function for using the transitory storage unit 2002, and an example of the function that exists in plural and is mainly used is described below.

- Specifying the number of pixels in the main scanning direction
- Specifying the number of lines to be entered
- Specifying the main-scanning start position of the image capture range
- Specifying the sub-scanning start position of the image capture range
- Specifying the number of lines on which interruptions occur The above is examples of a feature that is primarily used and is not limited to the above.

When accessing the communication I/F 2012 from the communication I/F 2011, communications must be performed according to a communication format 3003 shown in FIG. 5B. The communication format 3003 includes a 1st byte 4005 having Command and Internal Address and a 2nd byte 4006 having write data.

In the 1st byte 4005, the Command specifies "write access" or "read access". The Internal Address also specifies whether to access the upper address register unit 4001, lower address register unit 4002, upper data register unit 4003, or lower data register unit 4004.

The 2nd byte 4006 specifies data to be written to the register specified by the Internal Address in 1st byte 4005. However, if the Command is read access, the 2nd byte 4006 can be omitted.

The write access from the communication I/F 2011 to the communication I/F 2012 based on the communication format 3003 is performed in a sequence as shown in FIG. 5C. The communication I/F 2011 specifies write access to the Command of the 1st byte, specifies the upper address register unit 4001 to the Internal Address, and communicates with the top register unit 3001 of the communication I/F 2012. The top register unit 3001 returns the received data to the communication I/F 2011 in order to inform the communication I/F 2011 that the communication has been successfully performed. The communication I/F 2011 checks whether the data transmitted to the top register unit 3001 matches the data received from the top register unit 3001, and proceeds to the next step. In the following descriptions, the description of the step of notifying the successfully communication is omitted.

As described above, the write access to the upper address register unit 4001 is specified in the 1st byte. Therefore, in the 2nd byte, the communication is performed from the communication I/F 2011 to the top register unit 3001 of the communication I/F 2012 by specifying the upper address of the desired function register for each function register managed by the module register unit 3002. The top register unit 3001 stores the 2nd byte received from the communication I/F 2011 as an upper address.

Using the same procedure, the communication I/F 2011 specifies write access to the lower address register unit 4002 in the 1st byte and performs communications to the top register unit 3001 of the communication I/F 2012. Then, the communication I/F 2011 specifies the lower address of the desired function register for each function register managed by the module register unit 3002 to the 2nd byte, and performs communications to the top register unit 3001 of the communication I/F 2012. The top register unit 3001 stores the 2nd byte received from the communication I/F 2011 as a lower address.

Next, the communication I/F 2011 specifies write access to the Command of the 1st byte, specifies the upper data register unit 4003 to the Internal Address, and communicates with the top register unit 3001 of the communication I/F 2012. Then, the communication I/F 2011 specifies the upper data to be written to the function register in the 2nd byte, and performs communications to the top register unit 3001 of the communication I/F 2012. Upon receiving the 2nd Byte of data from the communication I/F 2011, the top register unit 3001 writes the top data to the module register unit 3002 specified by the upper address register unit 4001 and the lower address register unit 4002. Note that the same operation is applied to write access of the lower data. The above is the method for performing write access from the communication I/F 2011 to the module register unit 3002 via the top register unit 3001 of the communication I/F 2012.

Next, the read access will be described. Read access from communication I/F 2011 to communication I/F 2012 based on the communication format 3003 in FIG. 5B is performed in a sequence as in FIG. 5D.

The communications are carried out by the same procedure as for the write access to specify the upper address register unit 4001 and the lower address register unit 4002. Then, the communication I/F 2011 specifies read access to the Command of the 1st byte, specifies the upper data register unit 4003 to the Internal Address, and communicates with the top register unit 3001 of the communication I/F 2012. Since the Command is specified as read access, communications for the 2nd byte are not required.

If the top register unit 3001 receives a read access notification to the upper data register unit 4003, the top register unit 3001 reads the upper data from the module register unit 3002 specified by the upper address register unit 4001 and the lower address register unit 4002. The top register unit 3001 transmits the read data to the communication I/F 2011. At this time, the communication I/F 2011 cannot perform the next communication until the read data is received from the top register unit 3001.

The lower data is also read in the same manner. The above is the method for performing read access from the communication I/F 2011 to the module register unit 3002 via the top register unit 3001 of the communication I/F 2012.

Figure 6B:
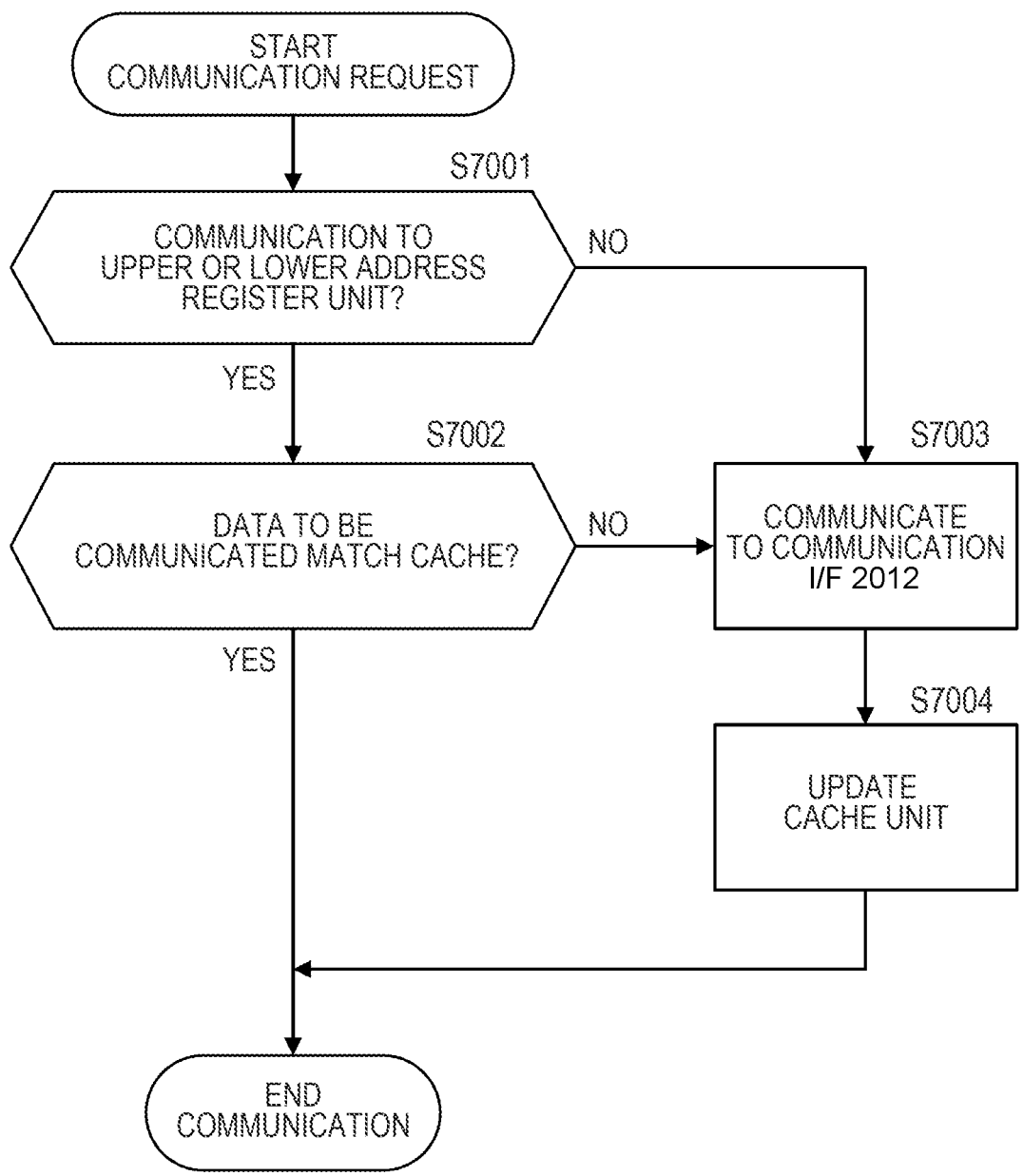
FIG. 6B illustrates a flowchart explaining the communication control method between communication I/Fs of the present embodiment.

Hereafter, a communication control method between communication I/Fs applying the present invention will be described with reference to FIGS. 6A, 6B, and 6C. FIG. 6A illustrates a block diagram of a communication control method between communication I/Fs to which the present invention is applied. As shown in FIG. 6A, the communication I/F 2011 has a cache unit 5001. The communication I/F 2011 temporarily stores information written to the top register unit 3001 in the cache unit 5001. The cache unit 5001 stores the information when writing to the top register unit 3001 is completed.

The cache unit 5001 includes an upper address cache unit 6001, a lower address cache unit 6002, an upper data cache unit 6003, and a lower data cache unit 6004. The upper address cache unit 6001 corresponds to the upper address register unit 4001. The lower address cache unit 6002 corresponds to the lower address register unit 4002. The upper data cache unit 6003 corresponds to the upper data register unit 4003. The lower data cache unit 6004 corresponds to the lower data register unit 4004.

Each cache unit 6001 to 6004 in the cache unit 5001 is initialized to achieve consistency with each register unit 4001 to 4004 when the image forming apparatus 100 starts up or when the image forming apparatus 100 resumes from a power-saving state (resumes from a sleep state). In the initialization processing, each cache unit 6001 to 6004 may be initialized by reflecting data read from (and obtained from) each register unit 4001 to 4004, or may always communicate with each register 4001 to 4004 on the first access to each register unit 4001 to 4004 to reflect data read from each register unit 4001 to 4004 in the cache unit 6001 to 6004.

The method of omitting part of the communications in the above configuration will be explained using FIG. 6B. FIG. 6B illustrates a flow chart explaining the communication control method between communication I/Fs to which the present invention is applied. The CPU 2008 of the image generating unit 2001 starts a communication request to the communication I/F 2011 to access the transitory storage unit 2002 based on a program operating on the RAM 2009. The start of the communication request occurs every time a write or read command is transmitted from the communication I/F 2011 to the top register unit 3001 of the communication I/F 2012 in FIG. 5C or FIG. 5B.

Upon receiving the above communication request, the communication I/F 2011 confirms whether the communication request is to the upper address register unit 4001 or to the lower address register unit 4002 (step S7001). In the case of a communication request to the upper address register unit 4001 or to the lower address register unit 4002 (Yes in step S7001), the communication I/F 2011 advances the process to step S7002.

In step S7002, the communication I/F 2011 checks whether the cache matches the data to be communicated or not. In detail, the communication I/F 2011 checks whether the contents of the communication request match the upper address cache unit 6001 in a case of the communication request to the upper address register unit 4001. In a case of the communication request to the lower address register unit 4002, the communication I/F 2011 checks whether the contents of the communication request match the lower address cache unit 6002. If the contents of the communication match the upper address cache unit 6001 or the lower address cache unit 6002 (Yes in step S7002), the communication I/F 2011 terminates the processing of this flowchart without communicating to the communication I/F 2012.

On the other hand, if the contents of the communication request do not match the upper address cache unit 6001 or the lower address cache unit 6002 (No in step S7002), the communication I/F 2011 advances the process to step S7003. In the above step S7001, if the communication request is not communications to the upper address register unit 4001 or to the lower address register unit 4002 (No in step S7001), the communication I/F 2011 advances the process to step S7003.

In step S7003, the communication I/F 2011 communicates with the communication I/F 2012. Then, in step S7004, the communication I/F 2011 confirms that the communication has been successfully performed, reflects the contents of the communication to one of the cache units 6001 to 6004 corresponding to the communication request, and terminates the processing of this flowchart. As a result, it is possible to omit communications only to the address register if the data is cached.

FIG. 6C illustrates an example of setting communication volume reduction in a communication control method between communication I/Fs to which the present invention is applied. The table in FIG. 6C illustrates some of the upper and lower addresses associated with the functions of the module register unit 3002. These functions can be set for all channels (CMYK) collectively or for each channel. Here, a pattern in which communications can be omitted at the upper address and a pattern in which communications can be omitted at the lower address are explained respectively.

First, we will explain the pattern in which communications can be omitted at upper addresses, using an example in which the settings are applied to all channels at once. In order to specify the number of pixels in the main scanning direction (all channels), it is necessary to write "0x00" in the upper address register unit 4001. Here, if communications are performed according to the flowchart of FIG. 6B, the communications correspond to communications to the upper address register unit 4001 in step S7001. Thus, the process proceeds to step S7002. In step S7002, it is checked whether the communication content "0x00" to the upper address register unit 4001 matches the cache. In this example, it is assumed that the cache is different from previous communication, and the process proceeds to step S7003. In step S7003, the communication is performed to the communication I/F 2012 and writing is performed to the upper address register unit 4001. Then, in step S7004, "0x00" is stored in the upper address cache unit 6001 of the cache unit 5001 in the communication I/F 2011 to update the upper address cache unit 6001. In the same procedure, "0x00" is written to the lower address register unit 4002, and "0x00" is stored in the lower address cache unit 6002 to update the lower address cache unit 6002.

Regarding the upper data register unit 4003 and the lower data register unit 4004, according to the flowchart of FIG. 6B, since the communication to the upper address register unit 4001 or the lower address register unit 4002 does not correspond to the communication in step S7001, the process proceeds to step S7003. In step S7003, an arbitrary value is written to the upper data register unit 4003 or to the lower data register unit 4004 in the communication I/F 2012, respectively. In step S7004, the upper data cache unit 6003 and the lower data cache unit 6004 are updated.

Next, in order to specify the number of lines to be input (all channels), it is necessary to write "0x00" to the upper address register unit 4001. However, since "0x00" is written in the upper address register unit 4001 in the previous communication in step S7002 of FIG. 6B and "0x00" is cached in the upper address cache unit 6001, it is possible to omit the communication I/F 2012 without actually performing the communication.

In addition, "0x01" needs to be written to the lower address register unit 4002. In step S7002 of FIG. 6B, since "0x00" was written to the lower address register unit 4002 in the previous communication and "0x00" was cached in the lower address cache unit 6002, the communication content does not match the cache. Therefore, steps S7003 and S7004 must be performed (the communications and update cannot be omitted).

For the upper data register unit 4003 and the lower data register unit 4004, arbitrary values need to be communicated in steps of S7001, S7003, and S7004. The above is an example of a pattern in which writing to the upper address register unit 4001 can be omitted.

Next, the pattern in which communications can be omitted at lower addresses will be described using the case of reflecting the setting for each channel as an example. In order to specify the number of pixels in the main scanning direction (channel 0), it is necessary to write "0x10" in the upper address register unit 4001. Here, if communications are performed according to the flowchart of FIG. 6B, the communication to the upper address register unit 4001 corresponds to the communication in step S7001. Thus, the process proceeds to the step S7002. In step S7002, it is checked whether the communication content "0x10" to the upper address register unit 4001 matches the cache. In this example, it is assumed that the cache is different from previous communication, and the process proceeds to step S7003. In step S7003, the communication is performed to the communication I/F 2012 and writing is performed to the upper address register unit 4001. Then, in step S7004, "0x10" is stored in the upper address cache unit 6001 of the cache unit 5001 in the communication I/F 2011 to update the upper address cache unit 6001. In the same procedure, "0x00" is stored in the lower address register unit 4002 to updated the lower address cache unit 6002.

Regarding the upper data register unit 4003 and the lower data register unit 4004, according to the flowchart in FIG. 6B, since communications to the upper address register unit 4001 or the lower address register unit 4002 do not correspond to the communication in step S7001, the process proceeds to step S7003. In step S7003, an arbitrary value is written to the upper data register unit 4003 or the lower data register unit 4004 in the communication I/F 2012, respectively. In step S7004, the upper data cache unit 6003 and the lower data cache unit 6004 are updated.

In the above state, in order to specify the number of pixels in the scanning direction (channel 3), it is necessary to write "0x40" in the upper address register unit 4001. In this case, in step S7002 of FIG. 6B, "0x10" is written in the upper address register unit 4001 in the previous communication, and "0x10" is temporarily stored in the upper address cache unit 6001. Therefore, since the communication content does not match the cache, it is necessary to perform communications by performing the steps S7003 and S7004 (i.e., the communication and update cannot be omitted).

It is also necessary to write "0x00" to the lower address register unit 4002, but the writing can be omitted. Specifically, in step S7002, "0x00" is written to the lower address register unit 4002 in the previous communication, and "0x00" is temporarily stored in the lower address cache unit 6002. Therefore, it is possible to omit communications to the communication I/F 2012. For the upper data register unit 4003 and the lower data register unit 4004, arbitrary values need to be communicated in steps of S7001, S7003, and S7004. The above is an example of a pattern in which writing to the lower address register unit 4002 can be omitted.

FIG. 7 illustrates a diagram explaining the sequence from job input to completion of printing in the image forming apparatus 100 to which the present invention is applied. Upon receiving a print instruction from the user, the image generating unit 2001 sets image data of a first page and reflects the setting to the transitory storage unit 2002 via the communication I/F 2011 (step 8001).

Next, the image generating unit 2001 transfers the image data from the image generating unit 2001 to the transitory storage unit 2002 via the data bus 2017 (step 8002). Upon receiving the image data from the image generating unit 2001, the transitory storage unit 2002 transfers the image data to the image forming unit 2003 via the data bus 2018 (step 8003). The image forming unit 2003 receives the image data from the transitory storage unit 2002 and transfers the image data to the engine control unit 1009 (step 8004). The engine control unit 1009 prints the image according to the received image data.

In parallel with the processing of transferring the image data to the transitory storage unit 2002 via the data bus 2017 shown in step 8002 above, the image generating unit 2001 sets the image data of the next page via the communication I/F 2011 (step 8005). When the image data transfer of the above step 8002 is completed, the image generating unit 2001 reflects the communication contents set in the above step 8005 to the transitory storage unit 2002 via the communication I/F 2011 (step 8006).

The above steps 8002 to 8006 are repeated from the first page to one sheet before the last page. If the repetition of the above steps 8002 to 8006 is finished, the image data of the last page is transferred from the image generating unit 2001 to the transitory storage unit 2002 (step 8007). The image data is transferred (step 8008) from the transitory storage unit 2002 to the image forming unit 2003, and the image data is transferred (step 8009) from the image forming unit 2003 to the engine control unit 1009. The job is completed if the engine control unit 1009 performs printing according to the image data on the last page.

The communication control between the communication I/Fs to which the present invention is applied, as shown in FIG. 6B, is applicable to the steps 8001, 8005, and 8006 above. That is, in the above steps 8001, 8005, and 8006, if the partial information of the address used for writing (upper address or lower address) matches the partial information of the address stored in the cache unit 5001, the writing of the partial information of the address can be omitted.

As described above, in the present embodiment, the settings for the image data are written in the transitory storage unit 2002 before the image data are transmitted from the image generating unit 2001 to the transitory storage unit 2002. At this time, the register address is written from the image generating unit 2001 to the transitory storage unit 2002, and the register address is temporarily stored. On the side of the transitory storage unit 2002, the register address written just before is stored while the register address is not changed. Furthermore, at the time of register access from the image generating unit 2001 to the transitory storage unit 2002, the image generating unit 2001 determines whether to access the register address or the data for the register address. Then, in a case where the register address is accessed, it is determined whether the contents to be written match the contents of the cache by using the upper 1 byte and the lower 1 byte, respectively. If the contents to be written matches the contents of the cache, writing to the transitory storage unit 2002 is omitted.

With the above configuration, according to the present embodiment, 2 bytes can be omitted if the register address completely matches the cache, and 1 byte can be omitted if either the upper 1 byte or the lower 1 byte of the register address matches the cache. Conventionally, communications of 4 bytes are required for access to one register, but according to the present embodiment, the efficiency in communications can be improved to ½ to ¾ of the conventional communication method. Although serial communication I/Fs are used for register access from the image generating unit 2001 to the transitory storage unit 2002, efficient serial communications can be performed by omitting the communications as described above. Therefore, when multiple sheets of image data are to be printed, the setting of the transitory storage unit 2002 for the image data of the next page can be performed while the image data of the current page is being transferred. In this way, it is possible to efficiently write settings by serial communication to a circuit having a transitory memory for buffer, which is provided between the image generating unit and the image forming unit. As a result, a reduction in processing speed in an image forming apparatus such as a digital multifunction peripheral can be suppressed and the printing operation can be accelerated. Furthermore, if more register access is required in response to increasing image processing on the printer engine, it is possible to realize the speed-up of the print operation by performing efficient serial communications according to the present invention. The structure and contents of the various data described above are not limited to the above, and they can be modified in various structures and contents according to the use and purpose.

Although one embodiment has been described above, the present invention can be implemented, for example, as a system, apparatus, method, program, or storage medium. Specifically, the present invention may be applied to a system including multiple devices, or may be applied to a device including a single device. In addition, all of the configurations in which the above examples are combined are also included in the present invention.

According to the present invention, settings can be written efficiently by serial communications to a circuit having a transitory memory for buffer, which is provided between the image generating unit and the image forming unit, so that the reduction in processing speed can be suppressed and the printing operation can be accelerated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157671, filed Sep. 28, 2021, which is hereby incorporated by reference herein in its entirety.

What is claimed is:

1. An image forming apparatus comprising:
    an image generating portion including a serial interface, the serial interface including a cache;
    an image forming portion including a memory configured to store instructions and a processor configured to execute the instructions to control a formation of an image based on image data; and
    a storing circuit arranged between the image generating portion and the image forming portion and being configured to temporarily store the image data,
    wherein the serial interface is configured to write a setting of the image data in the storing circuit, and
    wherein the serial interface is configured (i) to store, in the cache of the serial interface, partial information of an address used in a previous writing in the storing circuit and (ii) to omit writing partial information of an address to be used for a further writing in the storing circuit if the partial information of the address to be used for the further writing matches the partial information of the address, stored in the cache, used in the previous writing.

2. The image forming apparatus according to claim 1, wherein the partial information of the address includes an upper address or a lower address.

3. The image forming apparatus according to claim 1, wherein the serial interface stores the partial information of the address at a timing when the serial interface writes the setting of the image data.

4. The image forming apparatus according to claim 1, wherein the serial interface maintains consistency between the partial information of the address stored in the storing circuit and the partial information of the address at a predetermined timing.

5. The image forming apparatus according to claim 4, wherein the serial interface maintains the consistency by acquiring the partial information of the address stored in the storing circuit and storing the acquired partial information of the address.

6. The image forming apparatus according to claim 4, wherein the serial interface does not omit writing the partial information of the address to be used for the further writing if the serial interface writes the partial information of the address to be used for the further writing in the storing circuit at the predetermined timing.

7. The image forming apparatus according to claim 4, wherein the predetermined timing includes timing related to the startup of the image forming apparatus and timing related to recovery from a power-saving state of the image forming apparatus.

8. A control method for controlling an image forming apparatus including
an image generating portion including a serial interface that includes a cache, an image forming portion including a memory configured to store instructions and a processor configured to execute the instructions to control a formation of an image based on the image data, and a storing circuit arranged between the image generating portion and the image forming portion and being configured to temporarily store the image data, the control method comprising:
writing, by the serial interface, a setting of the image data in the storing circuit;
storing, by the serial interface, in the cache of the serial interface, partial information of an address used in a previous writing in the storing circuit; and
omitting, by the serial interface, writing partial information of an address to be used for a further writing in the storing circuit if the partial information of the address to be used for the further writing matches the partial information of the address, stored in the cache, used in the previous writing.

* * * * *